US009282574B2

(12) United States Patent
Kuroda

(10) Patent No.: US 9,282,574 B2
(45) Date of Patent: Mar. 8, 2016

(54) SHORT-DISTANCE WIRELESS COMMUNICATION SYSTEM AND METHOD

(75) Inventor: Masahiro Kuroda, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 907 days.

(21) Appl. No.: 13/393,316

(22) PCT Filed: Aug. 23, 2010

(86) PCT No.: PCT/JP2010/005180
§ 371 (c)(1),
(2), (4) Date: Jun. 14, 2012

(87) PCT Pub. No.: WO2011/024432
PCT Pub. Date: Mar. 3, 2011

(65) Prior Publication Data
US 2012/0244807 A1 Sep. 27, 2012

(30) Foreign Application Priority Data

Aug. 31, 2009 (JP) ................................. 2009-200535

(51) Int. Cl.
*H04B 7/00* (2006.01)
*H04W 74/06* (2009.01)
*H04W 74/08* (2009.01)
*H04W 84/18* (2009.01)
*H04J 3/06* (2006.01)

(52) U.S. Cl.
CPC .............. *H04W 74/06* (2013.01); *H04J 3/0652* (2013.01); *H04W 74/0891* (2013.01); *H04W 84/18* (2013.01)

(58) Field of Classification Search
CPC . H04J 3/0652; H04W 74/06; H04W 74/0891; H04W 84/18
USPC .......................................... 455/41.2; 370/350
See application file for complete search history.

(56) References Cited

U.S. PATENT DOCUMENTS

| 2005/0008040 | A1* | 1/2005 | Becker et al. .................. 370/503 |
| 2005/0201421 | A1* | 9/2005 | Bhandari et al. ............... 370/519 |
| 2009/0081951 | A1* | 3/2009 | Erdmann et al. .............. 455/41.2 |
| 2009/0141700 | A1* | 6/2009 | Baldemair et al. ............. 370/350 |
| 2009/0279496 | A1* | 11/2009 | Raissi-Dehkordi et al. .. 370/329 |

FOREIGN PATENT DOCUMENTS

| JP | 2006-140823 A | 6/2006 |
| JP | 2008-522459 A | 6/2008 |

OTHER PUBLICATIONS

International Search Report dated Sep. 14, 2010 issued in International Appln. No. PCT/JP2010/005180.

* cited by examiner

*Primary Examiner* — Ping Hsieh
*Assistant Examiner* — Xin Jia
(74) *Attorney, Agent, or Firm* — Holtz, Holtz & Volek PC

(57) ABSTRACT

In particular, even if sensors have their respective different timer precisions, the number of occasions when the sensors wait for data can be minimized, thereby reducing the output consumptions on the sensor sides. A coordinator (3) allocates, based on information previously received from sensors (2), the sensors to respective slots, which constitute a superframe, in a time sequence order and then notifies, to the sensors (2), the respective slots to which the sensors are allocated. When each of the sensors (2) transmits data to the coordinator (3), the sensor makes a synchronization request at the timing of the notified slot without receiving any beacons from the coordinator.

12 Claims, 10 Drawing Sheets

SHORT-DISTANCE WIRELESS COMMUNICATION SYSTEM AND METHOD

TECHNICAL FIELD

The present invention relates to a short-distance wireless communication system that implements transmission and reception of radio signals between a plurality of sensors and a coordinator, and, more particularly, to a short-distance wireless communication system which has small-sized sensors mounted on a human body for treatment and diagnosis of the human body.

BACKGROUND ART

In recent medial treatments, there are increasing cases where electronic devices (sensors) are mounted on a human body for treatment, and diagnosis of the human body. In this respect, attention is paid to studies on body area network (BAN) systems that establish wireless communication links between sensors mounted on a human body and a coordinator to implement wireless communication. Construction of a BAN system, among those BAN systems, which is focused on faster communication, ease in usage and reliability in order to acquire examination data on a patient in real time, is being progressed.

A conventional body area network (BAN) uses a network second layer (Media Access Control (MAC)) specified in IEEE 802.15.4, the short-distance wireless communication specifications for a personal area network (PAN). In obtaining a synchronization timing in time division multiple access (TDMA), this MAC employs a system of synchronizing with a coordinator based on the counter number of an accurate sequence number (counter) each sensor has. Devices with such a counter function have large power consumption, and are assumed on sensors that operate on a size AA battery of 2000 mAH or so. However, some of the sensors operating on a button battery of 2000 mAH or so do not have the hardware structure that generate such a sequence number, and are undesirably unable to achieve communication using MAC compliant with IEEE 802.15.4.

According to the TDMA synchronization specified in IEEE 802.15.4, a sensor receives a beacon (synchronization message) from a coordinator to take a timing. According to this system, however, the sensor always stands by for an incoming beacon, which undesirably increases power consumption.

There have been proposed several short-distance wireless communication systems assumed on their adaptation to a BAN (see, for example, Patent documents 1 and 2, and Non-Patent document 1). A short-distance wireless communication system generally executes wireless communication achieved on the assumption of the distance of 100 m or less (Bluetooth, IrDA, IrSimple, IrSS, NEC, Piconet, UWB, Wibree, Wireless USE, and Zigbee), and does not need to generate a sequence number in the sensor. In addition, there have not been proposed methods of reducing occasions where sensors stand by for data, thereby reducing the power consumption of the sensors as much as possible, even when the individual sensors constituting a BAN have different timer accuracies.

PRIOR ART LITERATURE

Patent Document

Patent document 1: Japanese Unexamined Patent Application Publication (Translation of PCT Application) No. 2008-503980

Patent document 2: Japanese Unexamined Patent Publication No. 2006-109433

Non-Patent Document

Non-Patent document 1: IEEE Std 802.15.4 2006

SUMMARY OF THE INVENTION

Problem to be Solved by the Invention

The invention has been made in consideration of the foregoing conventional problems, and it is an object of the invention to provide a short-distance wireless communication system and method that include, particularly, a BAN involving small-sized sensors mounted on a human body for treatment and diagnosis of the human body, and reduce occasions where sensors stand by for data, thereby reducing the power consumption of the sensors as much as possible, particularly when the individual sensors have different timer accuracies.

Means for Solving the Problems

To solve the problems, according to the invention, there is provided a short-distance wireless communication system that implements transmission and reception of a radio signal between a plurality of sensors and an at least one coordinator, the coordinator time-sequentially allocating the sensors to respective slots constituting a super frame based on information received beforehand from each of the sensors, and notifying the sensors of the allocated slots, the sensors making a synchronization request at timings of the slots corresponding to a super frame number indicating a synchronization-message resending timing without receiving a beacon from the coordinator when transmitting data to the coordinator.

The invention also has a technical feature of allowing each sensor to correct a deviation of a synchronization timing based on the minimum number of synchronization message exchanges with the coordinator even when timers installed in the individual sensors have different accuracies.

The invention further has a technical feature of automatically correcting a deviation (drift) between the timers of the sensor and the coordinator to make the number of synchronization message exchanges smaller. That is, because the deviation between the times of the sensor and the coordinator can be expressed by a linear function proportional to the elapsing time, the function is generated during implementation of initialization between the sensor and the coordinator, or during data transmission therebetween, and is used to make the time till synchronization longer.

Effects of the Invention

According to the invention with the foregoing structure, each sensor which is notified of an allocated slot makes a synchronization request on its own at the timing of the allocated slot which corresponds to a super frame number indicating a notified synchronization-message resending timing without waiting for a beacon unlike as done conventionally at the time of transmitting data to the coordinator. Each sensor can be set not to particularly go into a standby mode at any time except for the timing of the slot allocated to the sensor.

This system can reduce the number of synchronization messages exchanged between a sensor and the coordinator, and can eventually reduce the radio reception standby time of the sensor, thus making it possible to suppress power consumption at the time of data reception.

The invention concerns a BAN which includes ubiquitous small-sized sensors and a data collecting node (coordinator), and allows the small-sized sensors to transmit data in a time-divisional manner to ensure reaching of data transmission from the small-sized sensors to the coordinator at the time the sensors transmit the data. In adjusting the timing of data transmission at this time, the sensors exchange synchronization messages with the coordinator. To acquire a synchronization message, the sensor is in a mode of waiting for data reception. Although this standby for data reception increases the amount of power consumption, the number of times of standing by for synchronization is reduced according to the invention to reduce the amount of power consumption of a button battery, thereby making it possible to achieve continuous usage of the sensors over a long period of time.

Normal synchronization is carried out for each super frame. However, the present system takes synchronization whenever necessary even when the timers installed in the individual sensors have different accuracies, so that the number of data receptions can be reduced considerably. The use of the time-divisional approach keeps the order of reception of data when the coordinator receives the data from sensors, thus making it possible to easily identify the relation between data sent from the individual sensors.

MODE FOR CARRYING OUT THE INVENTION

A short-distance wireless communication system that implements transmission and reception of radio signals between a plurality of sensors and an at least one coordinator as a mode for carrying out the invention will be described hereinbelow with reference to the accompanying drawings.

Figure 1:
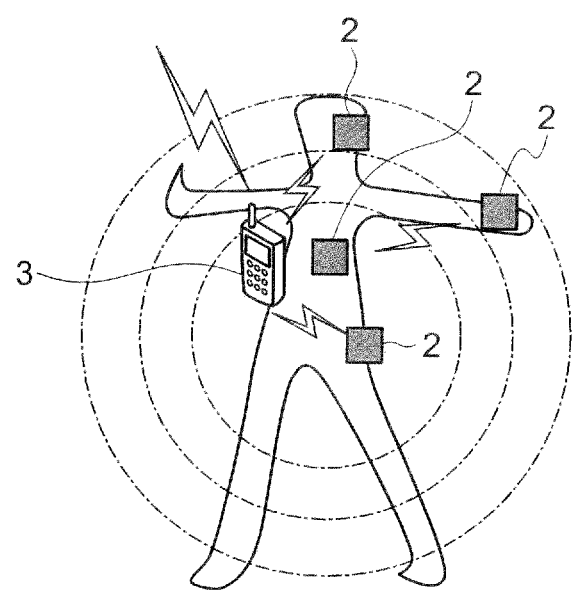
FIG. 1 is a structural diagram of a short-distance wireless communication system to which the invention is adapted.

A short-distance wireless communication system 1 to which the invention is adapted is used as what is called a body area network (BAN). As shown in FIG. 1, the short-distance wireless communication system 1 includes a sensor group 20 which is a collection of sensors 2 to be mounted on, or implanted in, a human body, and at least one coordinator 3 which implements transmission and reception of radio signals based on a wireless communication link established between the coordinator 3 and each of the sensors 2 constituting the sensor group 20. Internal and external information which are detected by the individual sensors 2 are sent to the coordinator 3 by wireless communication. The coordinator 3 transfers the internal and external information sent from those sensors 2 to a user.

In the short-distance wireless communication system 1, in actually effecting data synchronization between the sensors 2 and the coordinator 3, the sensors 2 including any sensor 2 which does not have a carrier sense capability take the initiative to synchronize data transmission and reception timings between the sensors 2 and the coordinator 3. The sensors 2 synchronize data transmission and reception with the coordinator 3 which manages the BAN. Even when timers provided in the sensors 2 have different accuracies, each sensor 2 corrects a deviation in synchronization timing with the minimum number of synchronization message exchanges between the coordinator and each sensor.

The sensor 2 is a small-sized sensor having a wireless communication capability, is desirably configured as a battery-operable sensor capable of continuously operating for 24 hours or longer, but is not limited to this. This sensor 2 may be one of a dynamic acceleration sensor for detecting the inclination of a human body at a current point, a cardiotachometry sensor or a cardiograph which measures a heart rate, a blood pressure sensor using a micropressure measuring device, a respiratory sensor which measures tracheal sounds or the like, a blood oxygen level saturation sensor, and blood glucose sensor.

Further, the sensor 2 may be mounted on an ear of a subject, such as an earring to measure continuous blood pressure, blood flow, heart rate or the like, or may be embodied as a wristwatch type manometer which is worn on a wrist of a subject like a wristband. Furthermore, the sensor 2 may be mounted on a human body as a part of an accessory put on the human body, or may be mounted on a belt to measure the number of paces, the body posture, the abdominal circumference, the respiration or the like of a subject.

In any of the structures, the coordinator 2 comprises a small-sized device which operates on a button battery, and a CPU (Central Processing Unit) installed therein may be configured to have eight bits or less.

The coordinator 3 comprises a device, such as a personal computer (PC) or a personal digital assistant, which is capable of performing control based on various programs under control of the CPU. The coordinator 3 is provided with various functions and an antenna for implementing transmission and reception of radio signals to and from the sensors 2.

Figure 2A:
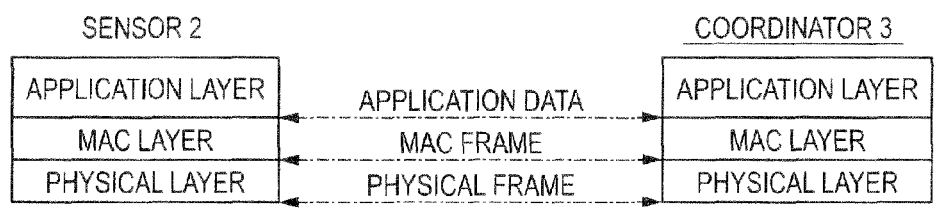
FIGS. 2A and 2B are diagrams for explaining a data communication method which is carried out between sensors and a coordinator.
Figure 2B:
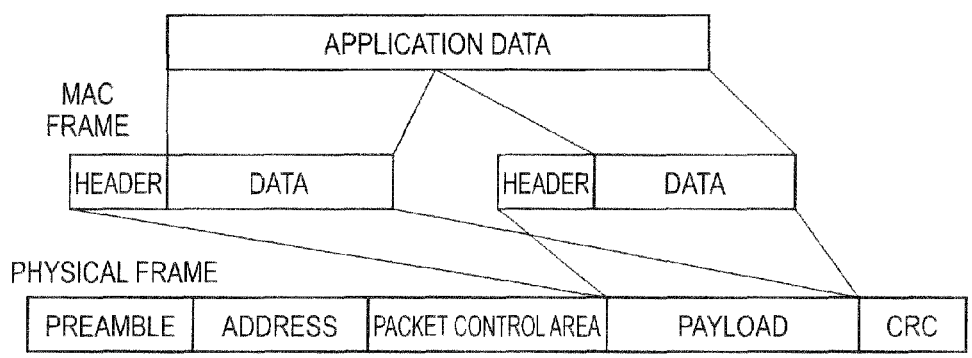

The sensors 2 execute data communication with the coordinator 3 under a network structure as shown in, for example, FIG. 2A. That is, the sensors 2 establish communication links with the coordinator 3 based on a protocol stack having a physical layer (PHY layer), a MAC layer, and an application layer. FIG. 2B shows the structure of frame data generated based on the protocol stack. The application data takes a form such that the application data is divided in the MAC layer, and is inserted in a PHY frame in the respective MAC layer to be transmitted to a counterpart.

According to the invention, following three types of logical channels are defined in the MAC layer. The logical channels can be roughly classified into a random access channel (RALC), a MAC data dedicated channel (MCLC) and a data access dedicated channel (DTLC).

The random access channel (RALC) is used for the sensor 2 to synchronize with the coordinator 3 when the sensor 2 starts up and joins the BAN. Because it is not known at which timing a sensor 2 starts up and joins the BAN, the coordinator 3 always monitors a logical channel allocated to this channel. The coordinator 3 sets a fixed logical channel RANDOM_CHANNEL_ADDRESS (e.g., 0x123456) common to all the sensors 2 to the RALC, and monitors reception from the sensors 2. After starting up, the sensor 2 sets the RANDOM_CHANNEL_ADDRESS to the RALC, and sends a request command to join the BAN.

The MAC data dedicated channel (MCLC) is a logical channel to perform transmission and reception of commands between the sensor 2 and the coordinator 3, excluding the joining request command from the sensor 2 to the coordinator 3. The MCLC is managed super frame by super frame which is divided into n GTS (Guaranteed Time Slots). At the time the sensor 2 joins the BAN, the sensor 2 synchronizes with the coordinator 3, and performs data communication using a CTS allocated to the sensor 2 by the coordinator 3. The sensor 2 transmits and receives a command over the MCLC at the timing of the slot (GTS) allocated to its own. Device-ID. The MCLC and the DTLC may be the identical logical channel.

The data access dedicated channel (DTLC) is a channel for performing data transmission and reception between a plurality of sensors 2 which have already joined the BAN (or which have already synchronized with the coordinator). The sensor 2 performs data transmission and reception over the DTLC at the timing of the GTS allocated to its own Device-ID.

Figure 3:
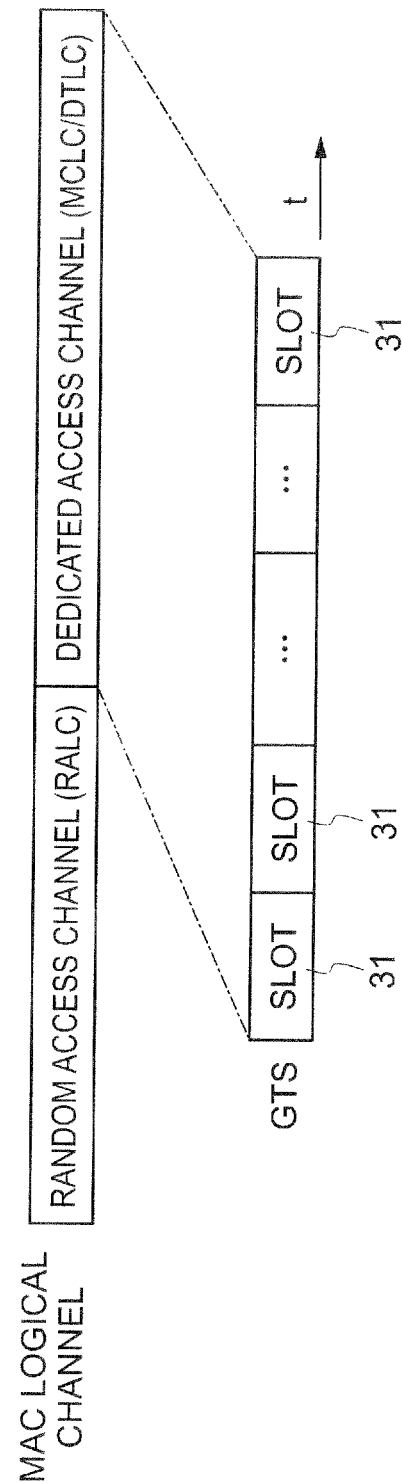
FIG. 3 is a diagram for explaining an MAC logic channel and a super frame (CTS) constituting the MAC logic channel.

As shown in FIG. 3, the coordinator 3 respectively allocates slots 31 to N sensors 2 to be managed, and data transmission and reception are performed in the slot 31 between the coordinator 3 and the sensor 2.

Figure 4:
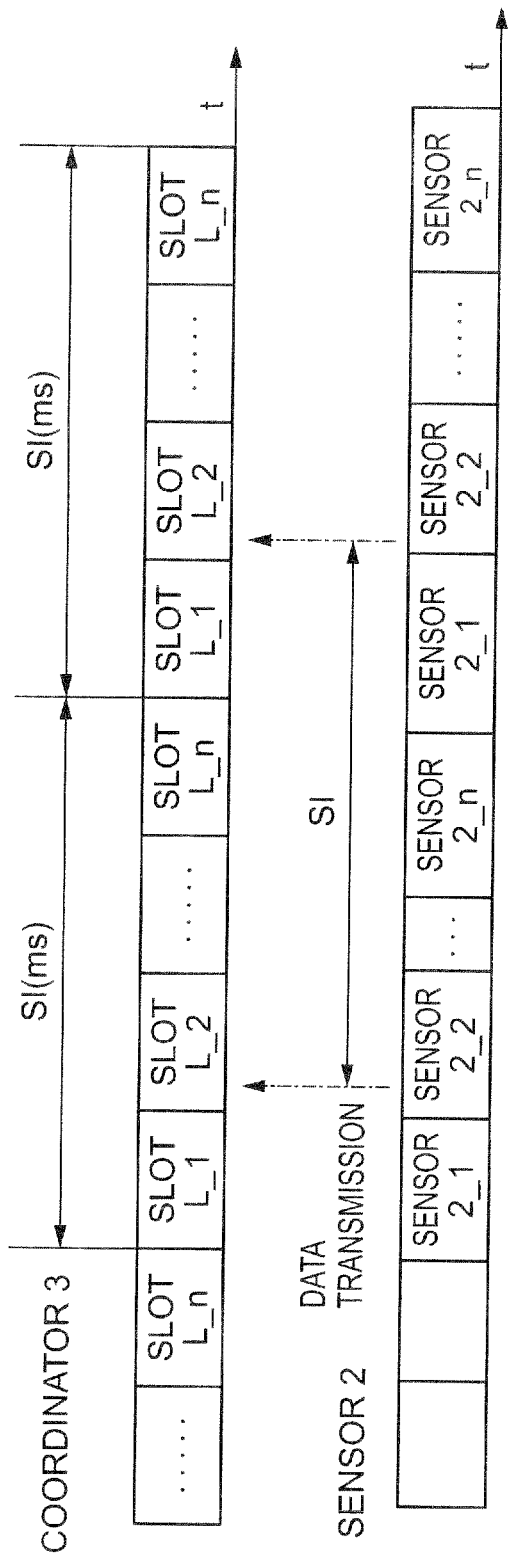
FIG. 4 is a diagram showing a sampling period image.

When the slots L_1 to L_n are formed by a super frame period (SI) as shown in a sampling period image in FIG. 4, for example, the coordinator 3 allocates the sensors 2_1 to 2_n to the respective slots L_1 to L_n. That is, the sensor 2_1 is allocated to the slot L_1, the sensor 2_2 is allocated to the slot L_2, and the sensor 2_N is allocated to the slot L_N (where N represents any integer in 1, 2, . . . , n) one by one.

The coordinator 3 sequentially monitors the slots L_1 to L_n, and performs transmission and reception of radio signals with the sensors 2_1 to 2_n allocated to the respective slots L_1 to L_n. By the way, the super frame period (SI) is determined by the following equation (1).

$$SI\ (ms) = \text{Min}\{\text{transmission interval } t_1 \text{ of sensor } 2\_1, \text{ transmission interval } t_2 \text{ of sensor } 2\_2, \ldots, \text{ transmission interval } t_n \text{ of sensor } 2\_n\} \quad (1)$$

That is, the super frame period (SI) is set according to the sensor 2 that has the shortest transmission interval.

The transmission interval $t_N$ of the sensor 2, which is based on the property of the sensor 2, should meet the following equation (2).

$$\text{transmission interval } t_N \text{ (ms) of sensor } 2 = N*SI \quad (2)$$

Next, the length of the slot L_N to be allocated to each sensor 2 should meet the following equation (3) for data transmission and reception that are necessary to be carried out within a time interval allocated to the sensor 2. In transmission from the sensor 2, the length value minus interslot gaps Tg formed by the overhead of transmission procedures is the actual transmittable time interval. The sensor 2 and the coordinator 3 complete data transmission within this time interval.

$$\text{slot width (ms)} = SI/\text{maximum number of accommodatable sensors (ms)} - Tg \times 2 \quad (3)$$

When the sensor 2 starts up and joins the BAN according to the short-distance wireless communication system 1 to which the invention is adapted, the sensor 2 needs to synchronize with the coordinator 3. In the synchronization, the coordinator 3 notifies the sensor 2 of an empty slot, the interslot gap Tg, a resynchronization SI count value, and so forth through bidirectional communication between the sensor 2 and the coordinator 3. Based on this information or the like, the sensor 2 and the coordinator 3 perform data transmission therebetween in the aforementioned slot width using the allocated slot L_n.

Figure 5:
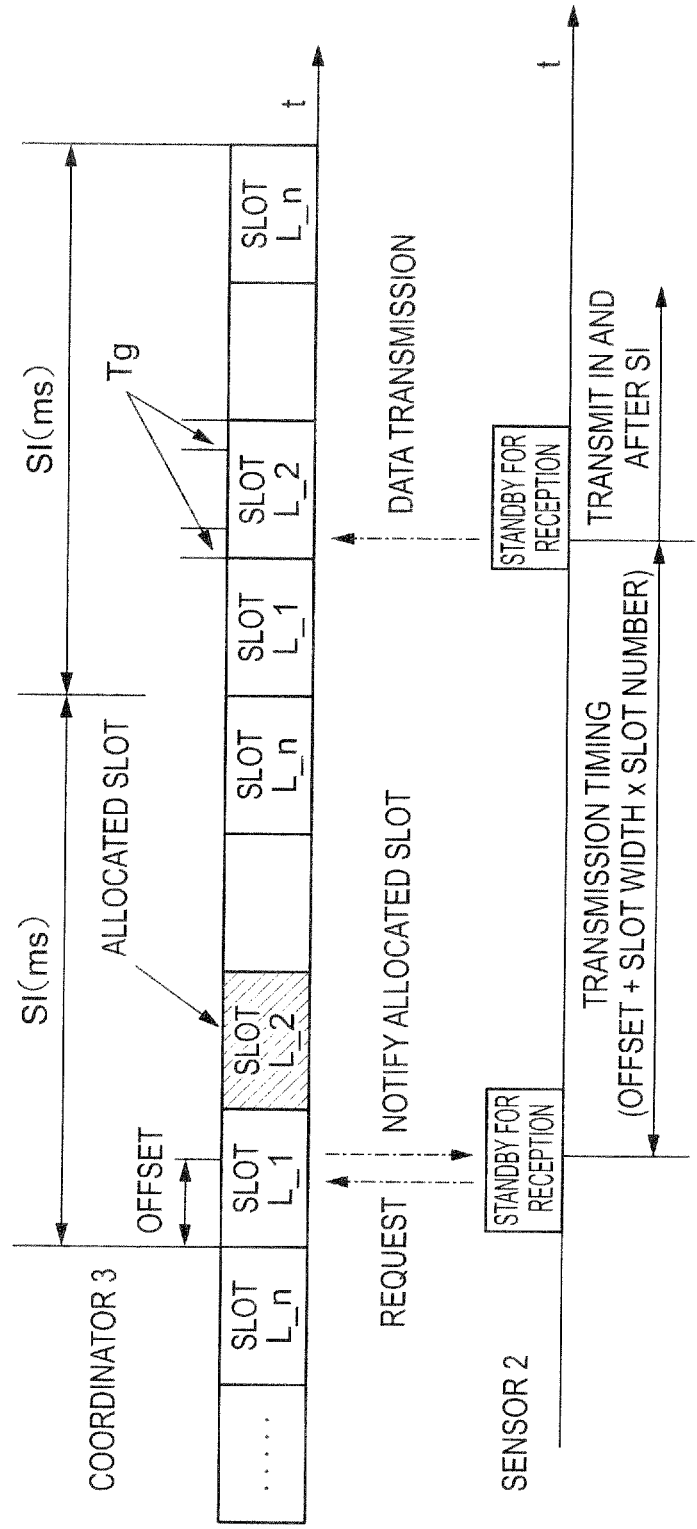
FIG. 5 is a time chart when synchronization is actually effected between the coordinator and the sensors.
Figure 6:
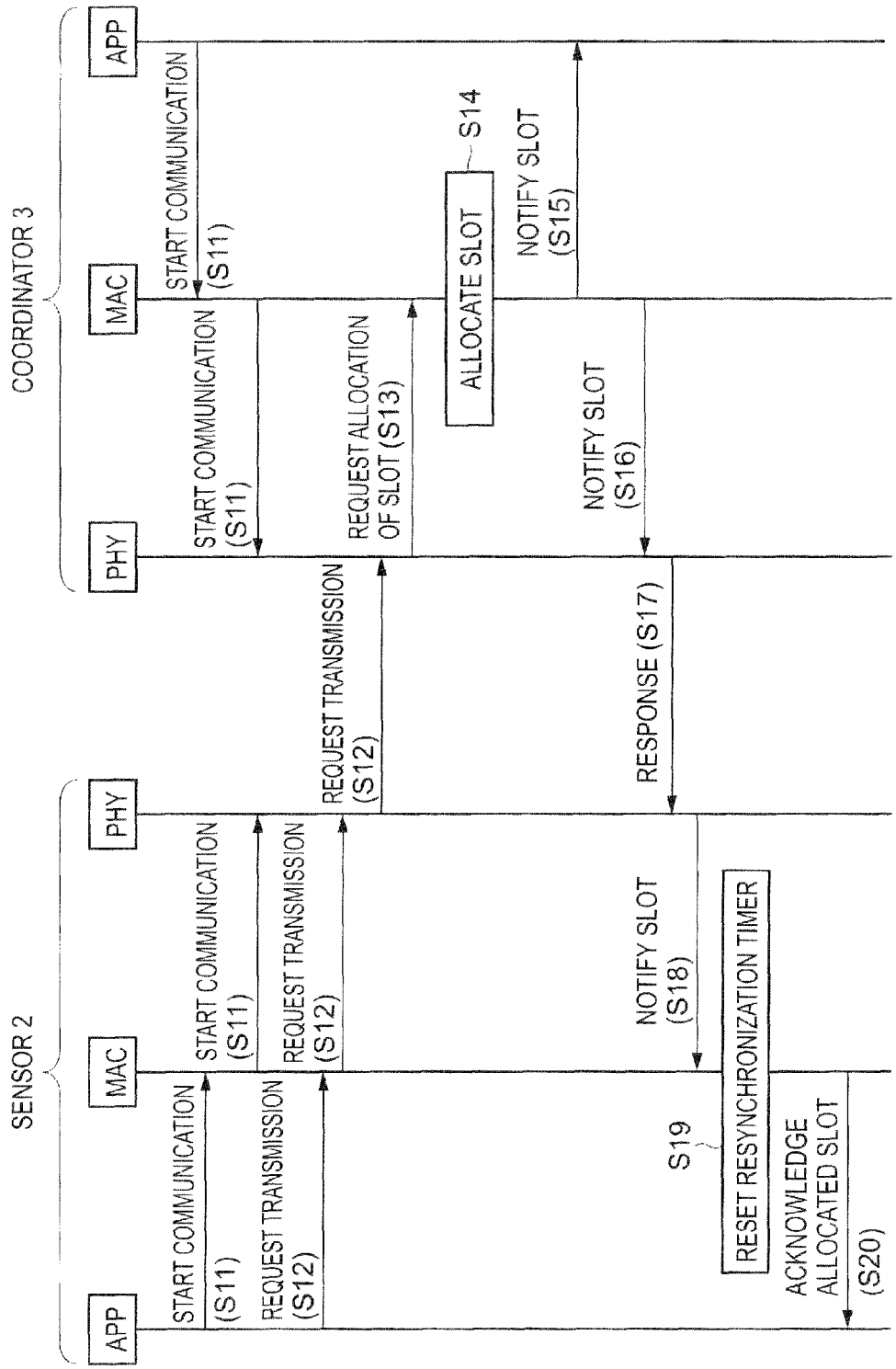
FIG. 6 is a flowchart when synchronization is actually effected between the coordinator and the sensors.

At the time the coordinator 3 and the sensor 2 actually synchronize with each other, the synchronization is carried out based on a time chart in FIG. 5 and a flowchart in FIG. 6. In the flowchart given below, an application layer is shown by "APP", a MAC layer by "MAC", and a physical layer by "PHY".

First, setting for initiating communication is made for the application layer, the MAC layer and the physical layer in step S11. The process of step S11 is executed on both the sensor 2 side and the coordinator 3 side. As a result, the sensor 2 and the coordinator 3 are set in communicable conditions.

Next, a transmission request made by the application layer of the sensor 2 is notified to the physical layer, and this transmission request is transmitted from the physical layer of the sensor 2 to the physical layer of the coordinator 3 via a wireless communication link (step S12). This wireless communication between the physical layer of the sensor 2 and the physical layer of the coordinator 3 is carried out over the RALC.

Next, in step S13, based on the transmission request received at the physical layer in the coordinator 3, this physical layer notifies the MAC layer of a request for allocation of a slot. The MAC layer of the coordinator 3 allocates a slot for the sensor 2 in step S14. The flow then moves to step S15 where the MAC layer of the coordinator 3 notifies the application layer of the slot allocated in step S14. In addition, the flow moves to step S16 where the MAC layer of the coordinator 3 notifies the physical layer of the slot allocated in step S14.

The flow then moves to step S17 where the physical layer of the coordinator 3 sends a response to the transmission request to the physical layer of the sensor 2 via the wireless communication link (step S17). The wireless communication link between the physical layer of the sensor 2 and the physical layer of the coordinator 3 is based on the RALC. Information on this response includes information on the slot allocated in step S14.

The flow then moves to step S18 where the physical layer of the sensor 2 notifies the MAC layer thereof the information on the slot included in the response. Next, in step S19, the resynchronization timer is reset. Next, the MAC layer of the sensor 2 notifies the application layer of the slot allocated to the sensor 2 in an acknowledgement manner.

Through the foregoing flow, the sensor 2 and the coordinator 3 can synchronize with each other, and wireless communication between the sensor 2 and the coordinator 3 can start.

In the allocation of a slot in the aforementioned step S14, the coordinator 3 time-sequentially allocates the sensor 2 to the slot L_n constituting the super frame (SI) as shown in FIG. 5 based on the information received beforehand in step S12.

Actually, there are n slots L constituting the SI, and the width of each slot L is calculated based on the equation (3). First, the sensor 2 makes a request indicated in the step S12. In the example of FIG. 5, the coordinator 3 receives the request at a timing equivalent to the slot L_1 over the RALC. Next, the coordinator 3 allocates a slot to the sensor 2 in step S14; it is assumed that the slot L_2 is allocated in this example. The coordinator 3 notifies the sensor 2 of the allocated slot L_2. The sensor 2 can know from the information received from the coordinator 3 that it is allocated to the slot L_2. Then, the sensor 2 resets the timer in step S19, and matches the timing for reception with the slot L_2. After the notification of the allocated slot, the sensor 2 relieves the reception standby state to be received from the coordinator 3. That is, wireless communication between the sensor 2 and the coordinator 3 thereafter is carried out without a beacon. Bringing the relieved state can reduce the consumption power of the sensor 2.

The sensor 2 matches the reception standby timing with the slot L_2 in and after the next SI. To achieve the matching, as the transmission timing, a time zone where data is transmittable to the coordinator 3 comes after a time corresponding to an offset+slot width×the number of slots elapses. The data transmittable time zones in and after the next SI are sequentially set at intervals of SI. As a result, the sensor 2 can make only the slot L2_2 allocated thereto as the timing for data transmission. Then, the sensor 2 makes a synchronization request to the coordinator 3 at the timing of the notified slot L2_2, and transmits real data to the coordinator 3.

The above-described processing operation is similarly carried out for a plurality of other sensors Consequently, the sensors 2_1 to 2_n are time-sequentially allocated to the individual slots L_1 to L_n constituting the SI, and the individual sensors 2_1 to 2_n are notified of the allocated slots L_1 to L_n.

Each of the sensors 2_1 to 2_n notified of the allocated slots L_1 to L_n makes a synchronization request at the timing of the slot corresponding to the notified resynchronization SI count value at the time of transmitting data to the coordinator. For each of the sensors 2_1 to 2_n, a time other than the timing of the slot allocated to the sensor 2 becomes a transmission time. As a result, the consumption power of the whole short-distance wireless communication system 1 can he reduced.

The coordinator 3 calculates the difference between the accuracy of its real time clock (RTC) and the accuracy of the RTC of the sensor 2 to adjust, the synchronization timing. The RTCs provided in the sensor 2 and the coordinator 3 will deviate from each other, and when the difference exceeds the allowance for the width of the allocated slot which is expected by each device, the coordinator 3 cannot receive data transmitted from the sensor 2 it is therefore necessary to set the super frame period (SI) again. The MAC or the like specified in IEEE 802.15.4 uses a synchronization method based on a beacon for each super frame from the coordinator 3. According to the invention, by way of contrast, after the sensor 2 joins the BAN (association) over the RALC, the sensor 2 keeps sending incremental data of a fixed byte size in each associated slot, in the SI over the MCLC, and counts the SI number until a loss in data occurs on the coordinator 3 side. At the timing at which the data loss has occurred, the count number—n (n: positive number) is sent to the sensor 2 over the RALC. Ideally, it is the count number—1, but n may be about 5% of the count number in operation. in consideration of a variation in the accuracy of the RTC.

Figure 7:
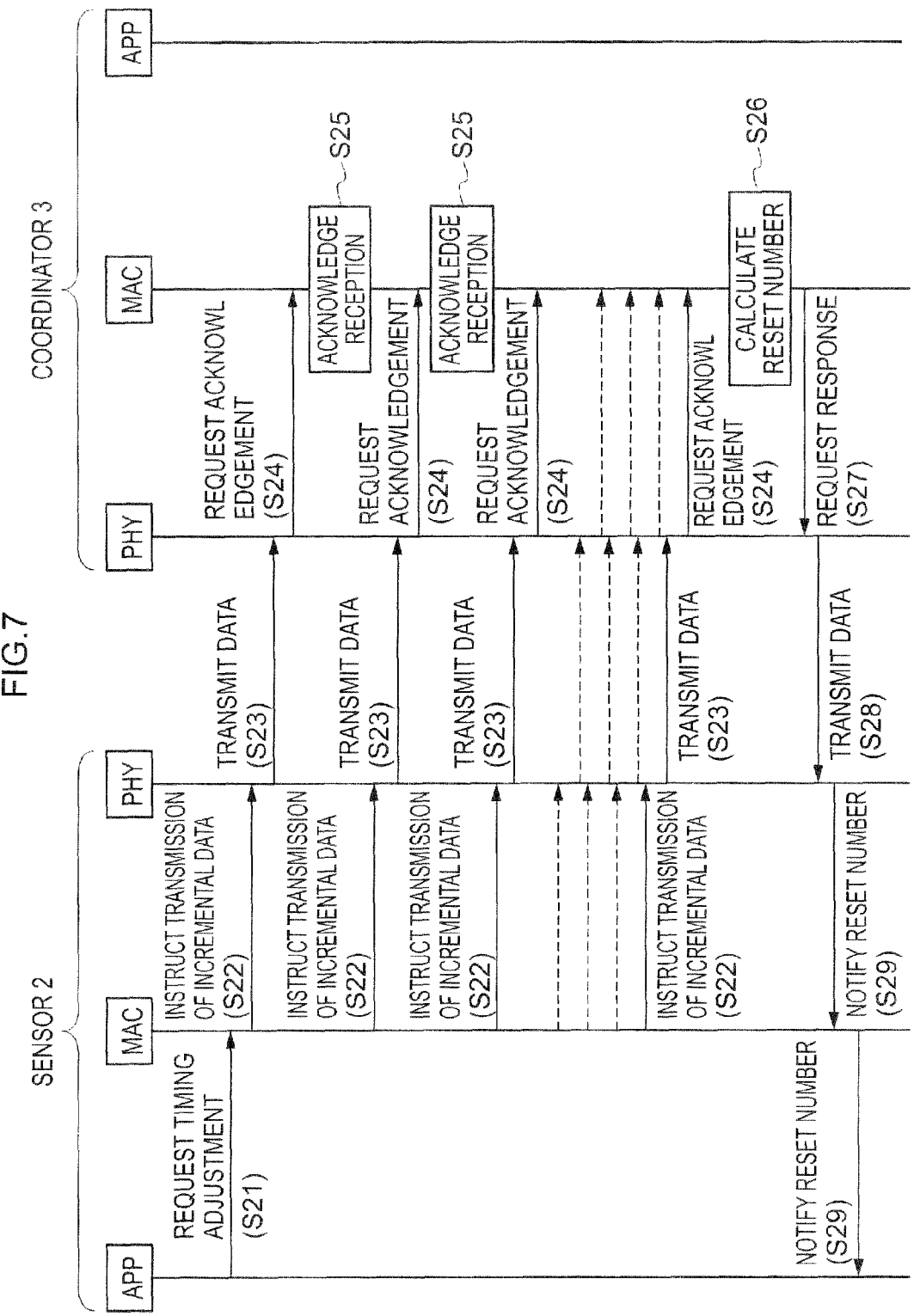
FIG. 7 is a flowchart for adjusting a synchronization timing.

FIG. 7 is a flowchart for adjusting the synchronization timing. First, in the sensor 2, the application layer requests the MAC layer to adjust the synchronization timing. The MAC layer, upon reception of the request, sequentially generates incremental data based on the RTC of the sensor 2, and instructs the physical layer to transmit the incremental data (step S22). Upon reception of the transmission instruction, the physical layer of the sensor 2 transmits the generated incremental data to the coordinator via the wireless communication link (step S23). The physical layer of the coordinator 3 receives the incremental data from the sensor 2, and request the MAC layer for acknowledgement (step S24). Upon reception of the acknowledgement request, the MAC layer checks whether the incremental data has been received in the slot (step S25). That is, in SC S25, it is checked it the sensor 2 has succeeded the reception in the slot for each super frame. Then, the operation of steps S22 to S25 is repeatedly executed. At this time, the counter for the incremental data is incremented by one at a time. The transmission interval for the incremental data is SI.

Figure 8:
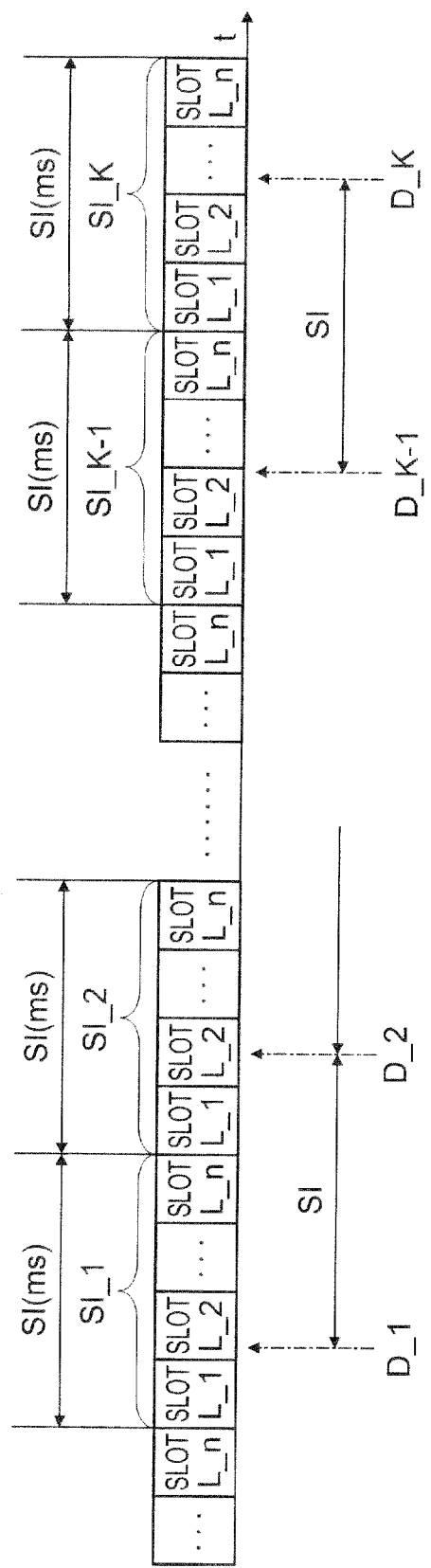
FIG. 8 is a time chart at the time of transmitting incremental data.

FIG. 8 illustrates a time chart at the time of transmitting the incremental data. The sensor 2 sequentially transmits incremental data D. Provided that the slot L_2 is allocated to the sensor 2 which transmits the incremental data D, the sensor 2 sequentially transmits the incremental data D to the slot L_2. The incremental data is sequentially transmitted in the order of data D_1, data D_2, . . . , data D_k−1, and data D_k. The transmission interval for the incremental data D_1 to D_k is generated based on the RTC provided in the sensor 2.

The coordinator 3 receives such incremental data D_1 to D_k in the slot L_2. Because the incremental data D_1 to D_k are transmitted at the interval of SI based on the RTC provided in the sensor 2, the coordinator 3 receives the incremental data D_1 to D_k at the SI interval. The individual incremental data D_1 to D_k are sequentially received in the SIs of the coordinator 3 (SI_1, S_2, . . . , SI_k−1, SI_k).

However, the SI set on the coordinator 3 side is just based on the RTC of the coordinator 3. The RTC of the coordinator 3 should not necessarily have the same accuracy as the RTC of the sensor 2, and there is often a slight difference therebetween. In such a case, the position of reception of the incremental data D in the slot L_2 gradually deviates with an increase in the counter value for the incremental data D. In the example shown in FIG. 8, the incremental data up to D_k−1 can be received in the slot L_2 of the SI_k−1, but the incremental data D_k cannot be received in the slot L_2 of the SI_k.

This means that the coordinator 3 cannot receive the incremental data D_k at the k-th transmission and thereafter due to the difference between the RTC of the coordinator 3 and the RTC of the sensor 2. This also means that even at the time of the normal transmission of real data from the sensor 2 to the coordinator 3, the coordinator 3 likewise cannot receive the real data at the k-th transmission and thereafter.

In this respect, the incremental data D is repeatedly transmitted through the process of steps S22 to S24 in FIG. 7, and the reception acknowledgement in step S25 is repeatedly executed to determine from which transmission the coordinator 3 has not been able to receive the incremental data. When reception is disabled at the k-th transmission, a data loss in the incremental data occurs in the SI_k, so that k can be easily counted on the coordinator 3 side. Then, the reset number is calculated in step S26 at the timing of occurrence of the data loss. The reset number is expressed by k−x (x being a positive number) when k is the number of occurrences of a data loss. That is, the reset number is expressed by a value less than the number k of occurrences of a data loss.

Next, the coordinator 3 notifies the sensor 2 of this reset number. Actually, the MAC layer makes a response request to the physical layer in step S27. The physical layer of the coordinator 3 transmits the reset number via the wireless communication link, established with the physical layer of the sensor 2, over the RALC in step S28. The physical layer of the sensor 2 notifies the MAC layer of the received reset number, and the MAC layer further notifies the application layer of the reset number.

The sensor 2 which has received the reset number this way understands that the RTC should be reset after data transmission is performed by the reset number. That is, repeatedly executing the operation of resetting the RTC after data transmission by the reset number can prevent a data loss from occurring on the coordinator 3 side.

Further, the number of transmissions/receptions of synchronization messages can be made smaller by automatically correcting a deviation (drift) in the timers of the sensor 2 and the coordinator 3. Because a deviation between the times on the sensor 2 side and the coordinator 3 side can be expressed by a linear function proportional to the time elapsed, the function is generated during implementation of initialization between the sensor 2 and the coordinator 3, or during data transmission therebetween, and is used to make the time till synchronization longer. This method can reduce the number of synchronization messages between the sensor 2 and the coordinator 3, and reduce the number of times the sensor 2 stands by for radio reception, thereby further suppressing power consumption in data reception standby mode.

In addition, the sensor 2 can acquire the reset number beforehand through the above-described flow before the sensor 2 transmits real data to the coordinator 3. At the time of transmitting real data 2, therefore, the sensor 2 can make resynchronization with the coordinator 3.

Figure 9:
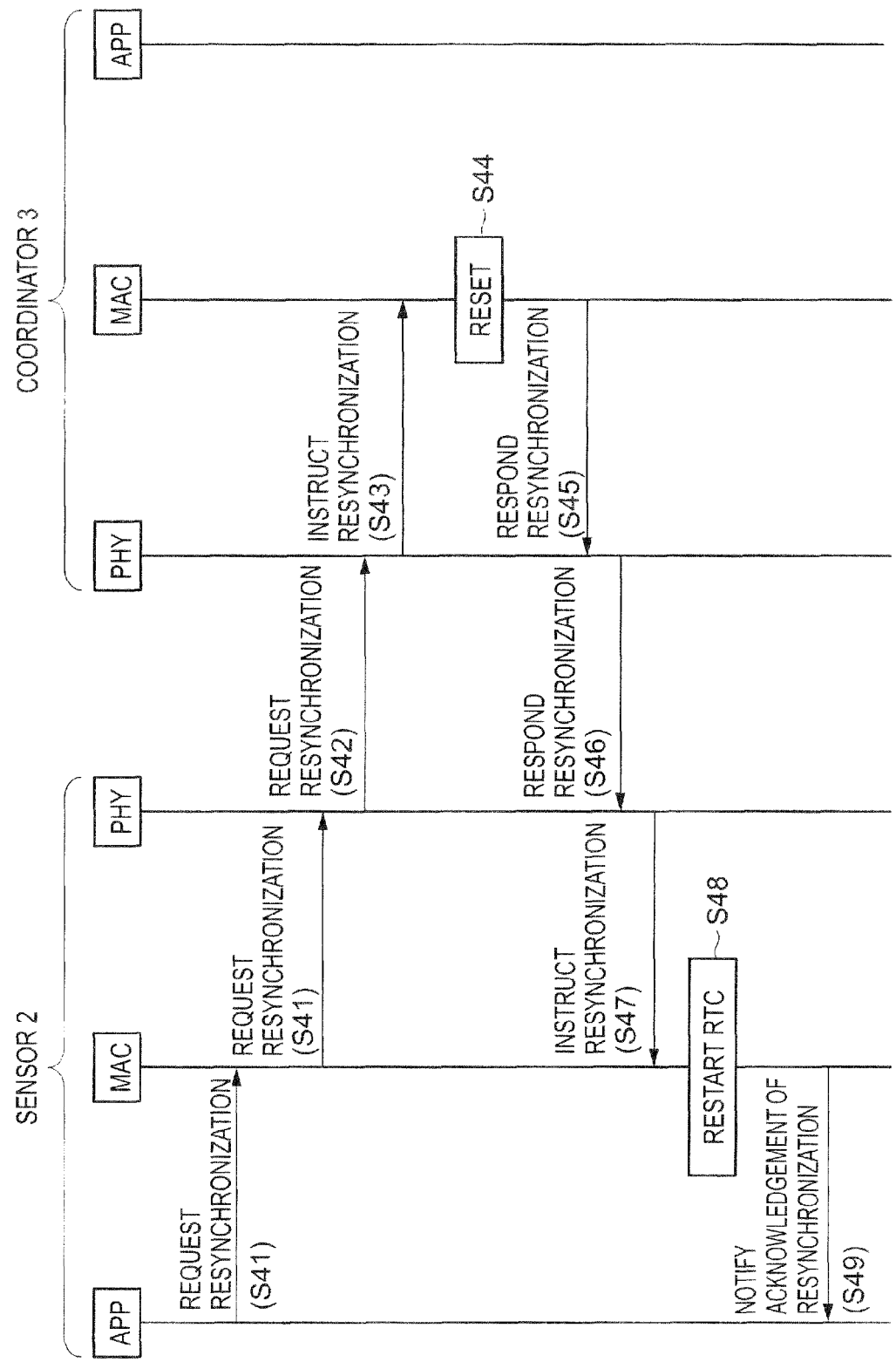
FIG. 9 is a flowchart for resynchronization based on a resetting operation.

FIG. 9 is a flowchart for resynchronization based on the resetting operation. First, in step S41, the application layer sends a request for resynchronization to the MAC layer because the reset number is reached, and the MAC, layer further sends the request to the physical layer. Next, the sensor 2 transmits the resynchronization request to the coordinator 3 over the MCLC, and the physical layer gives a resynchronization instruction to the MAC layer in the coordinator 3. The MAC layer resets the RTC provided in the coordinator 3 (step S44).

Next, the MAC layer notifies the physical layer to acknowledge the resynchronization (step S45). Next, the physical layer of the coordinator 3 sends a resynchronization acknowledgement to the physical layer of the sensor 2 over the MCLC (step S46). On the sensor 2 side, the physical layer gives a resynchronization instruction to the MAC layer (step S47), and the MAC layer restarts or resets the RTC (step S48). Next, the MAC layer notifies the application layer to acknowledge the resynchronization in step S49.

In addition to the aforementioned on-line setting of the resynchronization SI count value, it may be set by setting the count value, once measured, beforehand when the sensor 2 joins the BAN. However, this method requires that the quality of the timer of the sensor 2 should be kept constant. The resynchronization SI count value actually measured is 192 ms, and the operation with the resynchronization SI count value of 1500 is possible in the SI. As one evaluation index, the resynchronization SI count value may be set to 200 or so.

Although the timer drift of the sensor 2 and the timer drift of the coordinator 3 differ from each other, an offset may be set in light of the drift being a linear function of the elapsed time. This linear function F(t) can be expressed by the following equation (4) or the like.

$$F(t)=F(\Sigma^{M}_{k=1}(Tc, k-Tsn, k)/M, t)=\alpha t+\beta \quad (4)$$

This equation (4) is intended to perform correction to advance or delay the degree of advancement of the RTC value (time) which determines the slot timing to thereby further extend the resynchronization SI count value.

Figure 10:
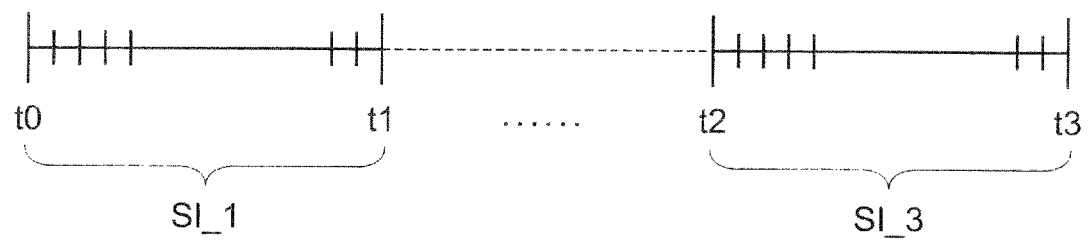
FIG. 10 is a diagram for explaining a conception of resynchronization counting.

The idea on the resynchronization count value will be described. Let us consider a case where there is a sequence of SIs, such as SI_1, . . . , SI_3, as shown in FIG. 10. The SI_1 is defined be an interval [t0, t1] which starts at t0 and ends at t1, and the SI_3 is defined by an interval [t2, t3] which starts at t2 and ends at t3. As shown in FIG. 10, t1 is defined by t0+SI_1× resynchronization SI count value, and t3 is defined by t2+SI_3 ×resynchronization SI count value.

At this time, as a result of occurrence of a drift in the SI_1 and SI_3, the lengths of the SI_1 and SI_3 deviate slightly. This deviation can be expressed as a linear function.

If the SI_3 is longer than the SI_3, for example, there is time delay of SI_3−SI_1 during [t0, t3]. That is, the drift-originated time deviation can be corrected in the interval [t0, t3] by setting the time of the RTC to calculate the SI faster by SI_3−SI_1 during [t0, t3].

In other words, the coordinator 3 has only to determine the resynchronization timing based on the linear function using proportionality constants α and β given in the equation (4) for the difference between the RTC of the coordinator 3 and the RTC of the sensor 2. Here, β is normally "0". Because there may be some variation at the time of executing initialization, however, the variation may be reflected on β.

For each SI, drift correction can be performed on the RTC based on the above concept, and can be achieved by using a linear function as mentioned above.

The correction of the resynchronization timing may be corrected by determining, on the coordinator 3 side, the resynchronization timing based on the linear function involving the difference between the RTC of the coordinator 3 and the RTC of the sensor 2 as the proportionality constant α, or by correcting, on the sensor 2 side, the RTC of the sensor 2 based on the linear function involving the difference between the RTC of the sensor 2 and the RTC of the coordinator 3 as the proportionality constants α and β.

Although the invention has been described on the premise that the sensor 2 is a wearable sensor to be mounted on a human body, the invention is not limited to this case, and the sensor may be used as any other sensor mountable on other than a human body.

DESCRIPTION OF REFERENCE NUMERAL

1 Short-distance wireless communication system
2 Sensor
3 Coordinator

The invention claimed is:

1. A short-distance wireless communication system comprising:
   a plurality of sensors; and
   at least one coordinator that implements transmission and reception of a radio signal between the plurality of sensors and the coordinator,
   wherein the coordinator time-sequentially allocates the sensors to respective slots constituting a super frame based on information received beforehand from each of the sensors, and notifies the sensors of the allocated slots,
   wherein the sensors make synchronization requests at timings of the notified slots without receiving a beacon from the coordinator when transmitting data to the coordinator,
   wherein, for each sensor, the coordinator calculates a reset number based on a difference between a real time clock (RTC) of the coordinator and an RTC of the sensor, and transmits the calculated reset number to the sensor, and the sensor repeatedly resets the RTC thereof in accordance with the reset number received from the coordinator, and then makes a resynchronization request to the coordinator, and
   wherein, for each sensor, the coordinator determines a resynchronization timing based on a linear function having a proportionality constant α which is a difference value between the RTC of the coordinator and the RTC of the sensor.

2. The short-distance wireless communication system according to claim 1, wherein, for each sensor, the coordinator receives incremental data sequentially generated based on the RTC of the sensor for each super frame, and calculates the reset number based on an incremental number until the incremental data departs from the slot allocated to the sensor.

3. The short-distance wireless communication system according to claim 1, wherein each sensor corrects the RTC thereof based on the linear function.

4. The short-distance wireless communication system according to claim 1, wherein the sensors are wearable sensors wearable on a human body.

5. A short-distance wireless communication method of implementing transmission and reception of a radio signal between a plurality of sensors and a coordinator, the method comprising:
by the coordinator, time-sequentially allocating the sensors to respective slots constituting a super frame based on information received beforehand from each of the sensors, and notifying the sensors of the allocated slots,
by the sensors, making synchronization requests at timings of the notified slots without receiving a beacon from the coordinator when transmitting data to the coordinator,
wherein, for each sensor, the coordinator calculates a reset number based on a difference between a real time clock (RTC) of the coordinator and an RTC of the sensor, and transmits the calculated reset number to the sensor, and the sensor repeatedly resets the RTC thereof in accordance with the reset number received from the coordinator, and then makes a resynchronization request to the coordinator, and wherein, for each sensor, the coordinator determines a resynchronization timing based on a linear function having a proportionality constant α which is a difference value between the RTC of the coordinator and the RTC of the sensor.

6. The short-distance wireless communication method according to claim 5, wherein, for each sensor, the coordinator receives incremental data sequentially generated based on the RTC of the sensor for each super frame, and calculates the reset number based on an incremental number until the incremental data departs from the slot allocated to the sensor.

7. The short-distance wireless communication method according to claim 5, wherein each sensor corrects the RTC thereof based on the linear function.

8. The short-distance wireless communication method according to claim 5, wherein the sensors are wearable sensors wearable on a human body.

9. The short-distance wireless communication system according to claim 2, wherein each sensor corrects the RTC thereof based on the linear function.

10. The short-distance wireless communication system according to claim 2, wherein the sensors are wearable sensors wearable on a human body.

11. The short-distance wireless communication method according to claim 6, wherein, for each sensor, the sensor corrects the RTC thereof based on the linear function.

12. The short-distance wireless communication method according to claim 6, wherein the sensors are wearable sensors wearable on a human body.

\* \* \* \* \*